(12) United States Patent
Ryan et al.

(10) Patent No.: US 6,374,036 B1
(45) Date of Patent: Apr. 16, 2002

(54) METHOD AND APPARATUS FOR COPY-ONCE WATERMARK FOR VIDEO RECORDING

(75) Inventors: John O. Ryan, Cupertino; Patrice Capitant, Los Altos, both of CA (US); Clayton L. Davidson, Lake Oswego, OR (US); James Holzgrafe, Morgan Hill, CA (US); Kordian J Kurowski, San Jose, CA (US); Andrew Mellows, Palo Alto, CA (US); Tony Forrest Rodriquez, Portland, OR (US)

(73) Assignees: Macrovsion Corporation, Sunnyvale, CA (US); Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/164,859

(22) Filed: Oct. 1, 1998

Related U.S. Application Data

(60) Provisional application No. 60/061,488, filed on Oct. 8, 1997, provisional application No. 60/076,668, filed on Mar. 3, 1998, provisional application No. 60/076,777, filed on Mar. 4, 1998, and provisional application No. 60/077,452, filed on Mar. 10, 1998.

(51) Int. Cl.[7] .................................................. H04N 5/91
(52) U.S. Cl. ........................... 386/94; 386/98; 380/203; 382/233
(58) Field of Search .............................. 386/94, 95, 1, 386/5; 360/60; 705/57; 348/473; 380/226, 203, 201, 242, 46; 382/233; H04N 5/91

(56) References Cited

U.S. PATENT DOCUMENTS

| | | | | |
|---|---|---|---|---|
| 5,134,496 A | * | 7/1992 | Schwab et al. | 386/94 |
| 5,315,448 A | * | 5/1994 | Ryan | 380/203 |
| 5,659,613 A | * | 8/1997 | Copeland et al. | 360/60 |
| 5,761,301 A | * | 6/1998 | Oshima et al. | 380/201 |
| 5,822,432 A | * | 10/1998 | Moskowitz et al. | 380/46 |
| 5,889,868 A | * | 3/1999 | Moskowitz et al. | 380/51 |
| 5,915,027 A | * | 6/1999 | Cox et al. | 380/54 |
| 5,940,134 A | * | 8/1999 | Wirtz | 348/473 |
| 5,991,499 A | * | 11/1999 | Yagasaki et al. | 386/94 |
| 6,122,403 A | * | 9/2000 | Rhoads | 382/233 |

FOREIGN PATENT DOCUMENTS

| | | |
|---|---|---|
| WO | WO 89/02293 | 3/1989 |
| WO | WO 96/06503 | 2/1996 |
| WO | WO 97/13248 | 4/1997 |

* cited by examiner

*Primary Examiner*—Vincent F. Boccio
(74) *Attorney, Agent, or Firm*—Norman R. Klivan; Victor Okumoto (57) ABSTRACT

Method and apparatus for "copy-once" of a digital video signal uses a watermark in the video signal. The embedded watermark has two versions: one indicates copy-never and a second indicates copy-once, the difference being a single watermark bit. The watermark carries additional bits representing a digitized attribute (image characteristic) of a particular video frame of the video signal, for instance an average value of the amplitude of a video field. The frame whose attribute is carried in the watermark has a field (or frame) marker, which is a special signal located in the overscan portion of the frame. A compliant video recorder verifies the watermark and the copy-once bit, extracts the associated attribute from the watermark, and compares it to the measured attribute of the marked video frame. Only if the extracted attribute value and the measured attribute value match is recording enabled. During the recording process, the frame markers are stripped, preventing second generation copies of the recorded video signal, and the copy-once bit is set to copy-never.

57 Claims, 6 Drawing Sheets

| WM1<br>(8 bits) | WM2<br>(4 bits) | WM<br>type detected |
|---|---|---|
| absent | ignored | no WM |
| present<br>payload=copy_once | valid | copy_once |
| present<br>payload=copy_once | invalid | Copy_no_more |
| present<br>payload=copy_never | ignored | Copy_never |

| WM1<br>(8 bits) | optional CRC<br>(4 bits) | WM2<br>(4 bits) | WM<br>type detected |
|---|---|---|---|
| absent | ignored | ignored | no WM |
| ignored | invalid | ignored | no WM |
| present<br>payload=copy_once | valid | valid | copy_once |
| present<br>payload=copy_once | valid | invalid | Copy_no_more |
| present<br>payload=copy_never | valid | ignored | Copy_never |

METHOD AND APPARATUS FOR COPY-ONCE WATERMARK FOR VIDEO RECORDING

CROSS REFERENCE TO RELATED APPLICATIONS

This application claims priority to U.S. provisional applications Ser. No. 60/061,488 filed Oct. 8, 1997, Ser. No. 60/076,668 filed Mar. 3, 1998, Ser. No. 60/076,777 filed Mar. 4, 1998, and Ser. No. 60/077,452 filed Mar. 10, 1998.

BACKGROUND

1. Field of the Invention

The present invention relates to copy protection of video material by embedding robust identification codes (e.g., watermarks or fingerprints) in video signals, and use of these identification codes for a "copy-once" method and apparatus.

2. Description of the Related Art

Copy protection of video material, for instance movies on video tape, is a well-known problem. A solution for conventional analog video taped material is the well-known Macrovision anticopy process, which adds pulses to the vertical blanking interval of the video signal (see Ryan U.S. Pat. Nos. 4,631,603 and 4,695,901, incorporated herein by reference). These added pulses confuse the automatic gain control circuitry of a typical VCR (video cassette recorder) and thereby make any recording of the video signal unviewable, by disrupting the picture.

Copy protection is an even more important problem with digital video, because by its nature a digital recording of a video signal is an exact replica of the original, and unlike analog recording, suffers no degradation. Hence with digital video recording there is even more incentive for people to make unauthorized copies of copyrighted video material. This has been a major impediment to the introduction of prerecorded digital video media and to commercial introduction of digital video recorders.

One known solution to this problem is use of watermarks. Watermarks are digital codes embedded in a video signal which can be read by a reader (detector) present in a compliant video recorder or player, where the watermark itself does not visibly interfere with the video signal (i.e., there is no significant degradation). The watermark is read by the detector circuitry in the recorder or player which instructs the recorder or player to perform certain functions, such as do not copy, or allow only a single copy of the material, depending on the watermark. Use of watermarks requires special detector circuitry in a compliant recorder or player.

Watermarks are special signals that are built into the video, so they cannot be stripped out without substantially damaging the video signal; it is difficult to remove a watermark deliberately or accidentally. Watermarks are a so-called bilateral copy protection scheme that require a specially adapted ("compliant") recorder/player which can detect and respond to the watermark. A conventional non-compliant recorder ignores the watermark and hence the watermark will have no effect. This to be contrasted with the above-described "unilateral" Macrovision anticopy process which however in general is not suitable for protecting a digital signal.

While such watermarks are useful and have already been introduced to a limited extent in commercial applications, they have significant drawbacks. The most important drawback is in the copy-once situation, typically encountered in the cable television industry with pay per view broadcasting, for instance of movies. The cable television industry has created an expectation amongst its subscribers that they are allowed to make their own personal recordings, using a VCR, of the cable transmission of for instance a movie. While this single recording by a user for his personal use has apparently generally been found acceptable by both copyright owners and the cable television industry, the copyright owners (e.g. movie studios) do not wish to allow any second generation recordings to be made. Hence it is desirable to allow a copy-once video transmission, for instance via cable television, while prohibiting any second generation copies of the first copy.

Prohibition of such second generation recordings is possible using conventional watermark technology. Typically, for this situation, there are two classes of watermarks: a "copy-never" watermark and a "copy-once" watermark. Both must be read by the compliant video recorder doing the copying, which changes the copy-once watermark to a copy-never watermark upon recording. A problem with this is the extra cost in the compliant recorder, since it must be able to detect both of the two different watermarks and also add (write) the copy-never watermark. Such a system, in addition to being relatively expensive to implement, is also easily subject to technical defeat, and hence is inadequate.

SUMMARY

There is a need for a copy-once method in the digital video recording field that offers improved economics and security over the existing art. There is also a need for a copy-once method that requires only one watermark and therefore only one watermark detector per compliant recorder (or player) apparatus. Such a method needs to have no watermark adders or modifiers in compliant recorders. ("Compliant" here means an otherwise conventional apparatus that has been modified by additions of special circuitry and/or software in accordance with the invention.) Manufacturers of video players and recorders will add the complying circuitry and software to their products if they wish to practice the invention, and suppliers of video material will similarly add the required signals to their programs.

Additionally such a system should be simple to execute, require no secrets to be maintained to ensure its security, and operate in both the analog and digital domains. A further requirement is that even if the first (permitted) recording is made on an existing conventional consumer VCR, whether VHS, S-VHS or 8 mm (which normally could not be expected to comply with a digital copy-once protocol), second generation copying by a compliant recording device is still prevented.

Therefore in accordance with the present invention, there is a single class of watermark, which has two versions: copy-never and copy-once, which are identical except for a single bit. In accordance with the invention there is no need to add a watermark to the video upon recording, because instead the copy-once watermark is converted, by a simple one bit change, to the copy-never watermark. ("Watermark" as used here means both watermarks and other types of digital "fingerprints.") The present invention is applicable to both digital video and analog video (e.g. VHS, S-VHS or 8 mm video), as described below. The present watermark survives conversion from the analog to the digital domain or digital to analog domain, survives compression, and survives conversion between television standards i.e., PAL to NTSC or NTSC to PAL.

In accordance with the invention, a watermark, which is a digital signal, is conventionally embedded in a video image. A subset of the watermark bits carries a digital attribute (a number) which is a numeric characteristic of the video signal, for instance an average amplitude of the video signal over one video field or frame. The video attribute in accordance with this invention preferably is some unique characteristic of a video signal which changes maximally from frame to frame and which is not subject to the typical distortion present in the associated analog or digital transmission channel. The attribute is used only for the copy-once situation.

To prepare (encode) the video with the watermark, in addition to conventionally embedding the watermark, one also randomly (or pseudo-randomly) chooses one frame (or field), for instance one frame per every 10 seconds of video, and digitally calculates the attribute for that frame (or field) of the video signal. A "field marker" ("tag") is also added to that frame to indicate that it is a selected frame. This field marker is a special signal located in the normally invisible portion of the video frame, for instance in the overscan portion.

The encoded video signal is conventionally transmitted e.g. via cable television or satellite, to the consumer who attempts to record it using his compliant digital video recorder. The compliant digital video recorder prior to recording examines the watermark, verifies it, detects the copy-once bit in the watermark, and extracts the associated attribute value from the watermark. The compliant recorder also detects the field marker on a particular marked field, measures the attribute of that particular field, and compares the measured attribute to the extracted attribute value. If these two attribute values match, then the recorder performs the recording. If they do not match, recording (copying) is not enabled.

At the same time, the video recorder as it performs the recording strips away the field markers from the video so as to prevent any second generation copying of the resulting recording. The absence of the field markers prevents any second generation recording of a particular video signal by a compliant recorder.

Hence the compliant video recorder includes a watermark reader (detector and verifier), an attribute measurement circuit, a field marker remover (stripper) and associated intelligence (software) in the microprocessor conventionally resident in such a video recorder to perform the needed computations and logic functions including the attribute comparison.

Advantageously the field marker is a signal that cannot be detected and played back by conventional analog VCRs, since the field markers are chosen to be of a type removed by the chroma filtering circuitry conventionally present in such analog VCRs. Hence if the originally transmitted video signal is recorded using such a conventional analog recorder, the field markers are lost in the analog recording process, thus preventing any compliant digital recorder from making a second generation copy.

The field marker is typically inserted in the invisible portion of the active video, i.e. with regard to television sets in the overscan region. The field markers alternatively are located in the vertical or horizontal blanking intervals. The field marker is preferably a signal of a type automatically removed, as described above, by a conventional recording device, but this is not a requirement.

While a typical application of the present watermarking process is in the above-described cable television or satellite distribution system, this is not limiting. Usually of course prerecorded video material, for instance on tape or DVD (digital versatile disk), would not be subject to this process since normally such material is not subject to copy-once but is "copy-never". However, the present copy-once watermarking process may be applied to prerecorded video material.

DETAILED DESCRIPTION

Basic Process

In accordance with the invention, a watermark is applied to (encoded onto) a video signal with a "payload" of e.g., 8 bits. (Payload is the number of changeable bits.) Bits 1 and 2 of the eight payload bits are the conventional (in digital video) Copy Generation Management System (CGMS) bits, and bits 3 and 4 are the Analog Protection System (APS) bits. The actual Analog Protection System is e.g. the well known Macrovision video anti-copy process. These four bits therefore have the conventional use which is to indicate copy-once/copy-never/copy no more, and to turn the Analog Protection System on or off. (The Macrovision or other analog anti-copy processes have applicability to digital recording because digital video recorders usually have an analog video signal input capability.) The remaining four payload bits define, in accordance with the invention, an image attribute of the selected frame the underlying video signal, examples of which are described below.

For a "copy-never" program (video signal), bits 1 and 2 of the eight payload are set to the values (1, 1), following the usual convention. Bits 5 through 8 are then "don't care". A compliant recording device, on detecting the (1, 1) bit configuration refuses to make any recording of the material.

For a "copy-once" program, bits 1 and 2 are set to the values (1, 0), again following the usual convention and bits 5 through 8 now carry the 4-bit representation of the attribute of the program. "Attribute" here means a numeric expression of some characteristic of the video material. An attribute preferably changes maximally from frame to frame so long as the picture changes. An attribute preferably does not change with expected distortions in the video signal due to distortion caused by an analog or digital communications channel carrying the video signal such as noise, non-linearity, or frequency response.

A compliant video recording device, on detecting the (1, 0) bit copy-once configuration, computes the same attribute from an associated video frame and compares it to the value carried on payload bits 5 through 8. If there is a match, copying is permitted to continue. If no match, copying (recording) is terminated. In other words, a copy-once instruction which yields a non-matching attribute stops the recording process by the compliant recording device. Finally, as the allowed first generation recording is being made, the video being recorded is modified on the recording so that subsequent compliant recording devices can not validate the attribute value carried by the watermark, thereby prohibiting further copying.

Implementation

The following more detailed description of one embodiment of this method takes into account the possibility that the watermark reader circuitry may take e.g. 10 seconds or longer to unambiguously detect and decode the watermark in the presence of noise, or after scaling. The specified time intervals are only for example.

Encoding Operation

1. Encoding refers to the "head end" process of protecting the video material. In every e.g. 20 second interval of the program, the encoding apparatus selects one video field (or frame) at random within the first five seconds that would permit reliable measurement of the attribute, even after the video has been subjected to the various above-described distortions found in analog or digital transmission systems. The encoding apparatus measures the attribute's value for the selected field or frame.

2. After waiting a randomly chosen interval (e.g. zero to 5 seconds, to enhance security), the encoding apparatus encodes the measured attribute value of the selected field in the otherwise mostly conventional watermark, as a 4-bit digital word. (If preferred, the watermark is added continuously to the video with these 4 bits set to some disallowed value, e.g. F (hex), until instructed to carry the attribute value.)

3. The encoding apparatus marks the field selected in step 1 so that compliant recording devices can reliably locate it. The following is an exemplary field marking method: Blank about the first microsecond of the first horizontal scan line of every video field, and on the selected field only, add a 25 IRE amplitude increase (pulse) during that one microsecond interval. A more versatile marking method is described below.

Figure 1:
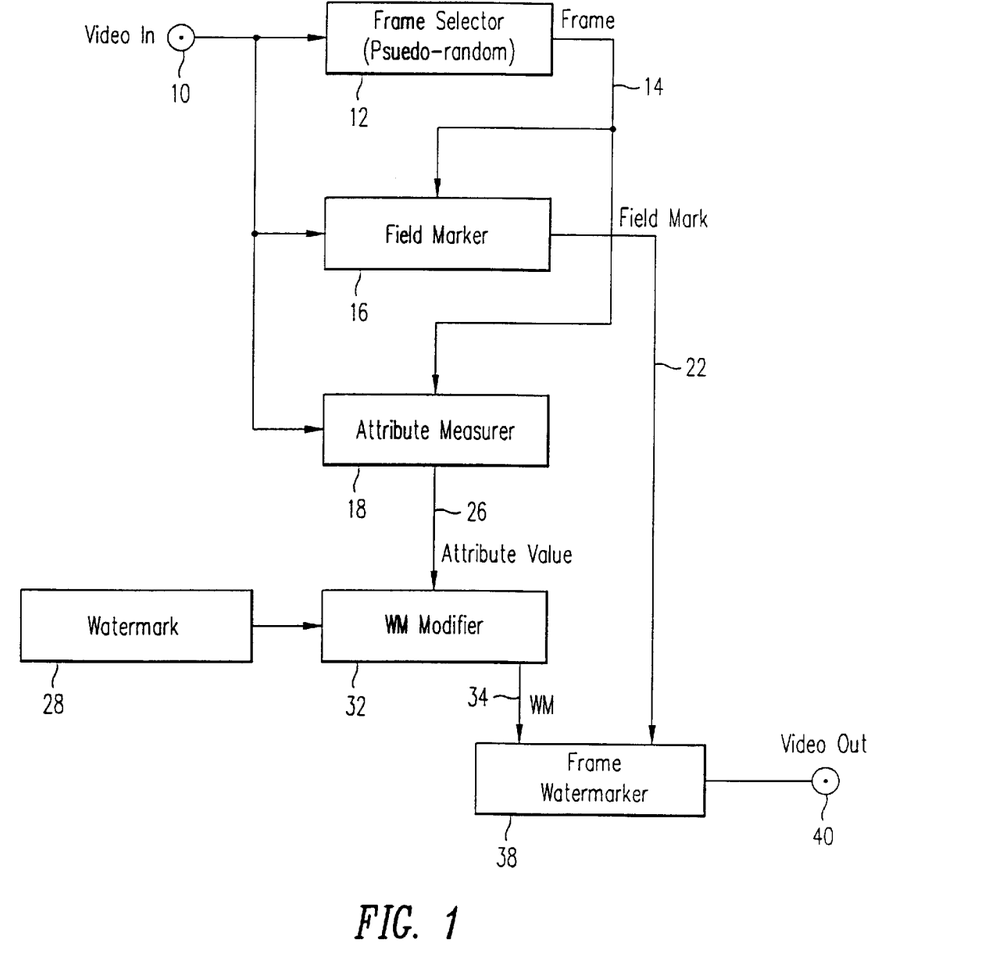
FIG. 1 shows a block diagram of an encoder in accordance with the invention.

FIG. 1 illustrates an exemplary encoder apparatus located e.g. at a cable television system "head end." The video program, prior to cable transmission to the subscribers, is applied at input terminal 10. Since this is digital video, terminal 10 is typically a multi-line (bus) connector. A frame selector 12 randomly or pseudo-randomly selects particular fields or frames, as described above, for encoding, and provides an indication of each selected field or frame on control line 14. In response, field marker circuit 16 marks each frame so indicated in the video. Control line 14 is also coupled to attribute measurement circuit 18 which also receives the incoming video and calculates (measures) the attribute of the selected fields or frames. The measured digital attribute value is coupled on line(s) 26 to watermark modifier circuit 32. Element 32 receives the conventional watermark from a conventional watermark generator 28 and modifies it with the 4-bit attribute value. The so-modified watermark is coupled to frame watermarker circuit 38 which writes the modified watermarks to each of the fields or frames carrying the field marker, supplied on line 22. The watermark video is then output on terminal 40 to the cable (or other) distribution network. It is to be understood that some of the elements of FIG. 1 (and also FIG. 2) are circuitry and others represent circuitry or functions carried out e.g. in a programmed microprocessor.

Reading Operation In a Compliant Recorder

1. During the recording process, on detecting a field marker of the type described above in the received video program, the compliant recorder/player measures and stores the attribute of that field or frame.

2. The recorder/player compares the measured attribute to the attribute value decoded (extracted) from the watermark. The comparison is made only if the watermark detector in the recorder/player first concludes with high confidence that it has correctly decoded (verified) the watermark.

3. If the two attribute values match, recording is allowed to continue. A match does not require identical values, but may allow for some inaccuracies of measurement, i.e. have some tolerance. If the two attribute values fail to match, or if periodic field markers are absent from a copy-once designated program, recording is disabled.

4. The recorder deletes all field markers during its recording process. Alternatively, a "decoy" field marker is applied to a field whose attribute differs markedly from that carried by the watermark, but this extra step may not be necessary. Simply deleting all field markers should suffice. Deleting the field markers advantageously obviates the need to modify the video in order to force a different attribute measurement during a subsequent recording attempt.

Figure 2:
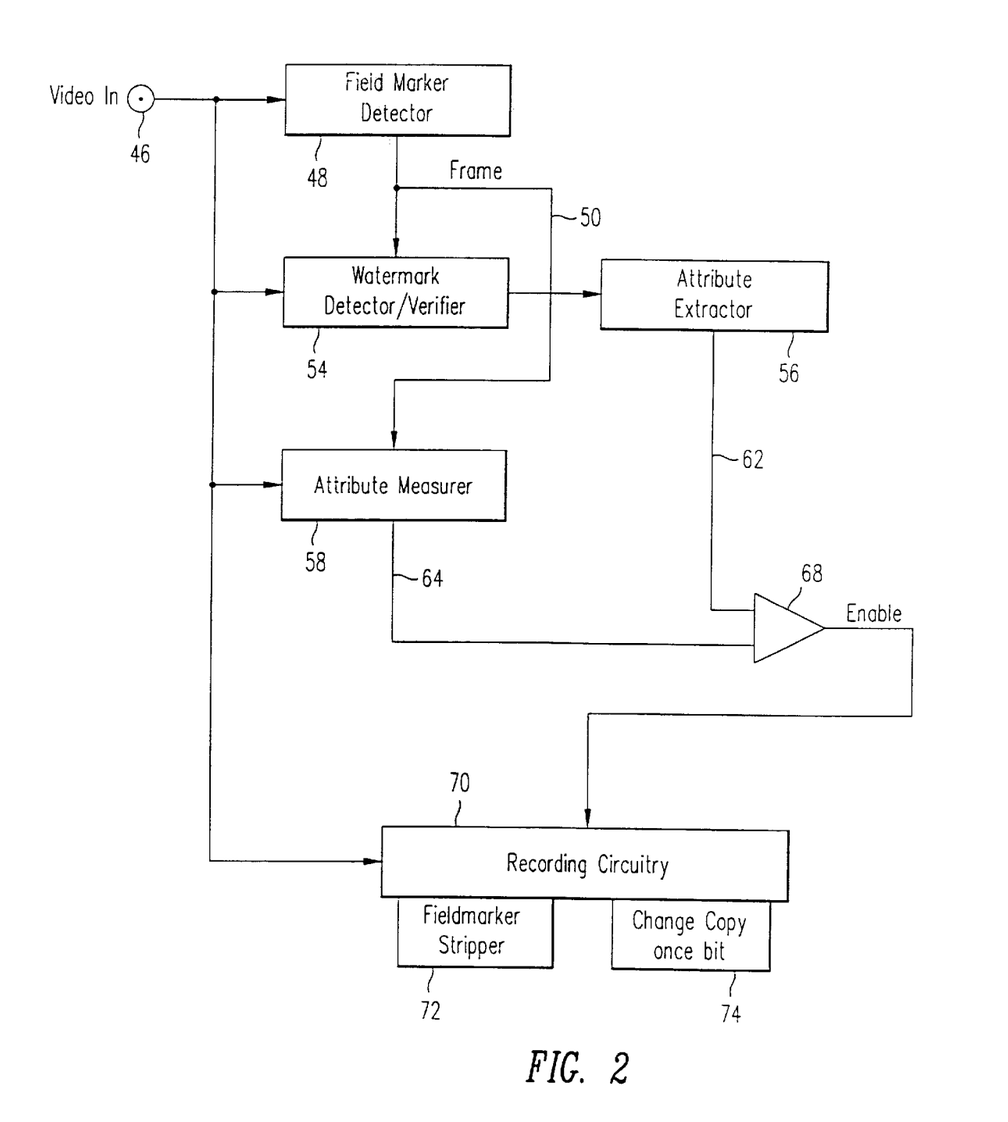
FIG. 2 shows a block diagram of a recorder for a watermark/play control scheme in accordance with the invention.

An exemplary compliant recorder is shown in FIG. 2; it is complementary to the FIG. 1 encoder. The input digital video, carrying the field markers and watermarks, is applied at input terminal 46 to field marker detector 48 which detects each field marker and outputs an indication of the marked frames on control line 50 to an essentially conventional watermark detector/verifier 54. Verifier 54 checks for the presence of the copy-once bit and conventionally verifies the watermark. The 4 attribute bits are then extracted from the verified watermark by extractor 56 and passed on line 62 to comparator 68. Attribute measurement circuit 58 also receives the input video and in response to the signals on line 50 measures (calculates) the predetermined attribute of the marked frames as indicated on control line 50. The measured attribute value is coupled to comparator 68 on line 64. If comparator 68 finds a match, only then is otherwise conventional recording circuitry 70 enabled. (Recording circuitry is a conventional digital video tape or disc recorder.) Coupled to recording circuitry 70 is field marker stripper circuitry 72 and a circuit 74 to change the copy-once bit to the copy-never value during recording.

Protocol Security

For a "hacker" (copyright infringer) to defeat this system, i.e. to modify a first generation legitimate video recording so that it is capable of being recopied by compliant recorders, he must do the following (or a process equally complex). First, during playback of the first (legitimate) recording, he measures and stores the attribute of every field and decodes the watermark. Then, he adds a field marker to a field whose attribute agrees with that carried by the watermark.

This "hack" requires many seconds of video delay at MPEG-2 (compressed video) rates, a watermark reader and an attribute measuring system. (The video being copied is typically in MPEG-2 compressed form.) Further detail is provided below.

The present process therefore easily meets the goal of preventing "hacking" by most people, especially considering the minimal rewards to be derived from hacking this part of the typical overall copy-protection system. A copy-once scheme need not be as "hack-proof" as is the basic watermark, because programs labeled "copy-once" will usually by their nature be less valuable to the copyright owner than "copy-never" programs. In any case, a hacker wanting several copies could simply (and arguably legitimately) make them in parallel from the copy-once original video program.

Attribute Requirements

The ideal image attribute in accordance with the invention is:

1. Measurable in a consumer-type digital video recorder with minimal added circuitry.
2. Relatively immune to the usual video level errors: non-linearity, noise, tilt, frequency distortion, quantization and compression artifacts etc., found in various analog and digital transmission systems.
3. Such that a hacker could not easily modify a video signal to force a particular attribute value without seriously degrading the entertainment value of the program.

One may be able to dispense with this third requirement, since in the context of the present copy-once protocol, it may not make the hacker's job materially more difficult.

Examples of Attributes

First Example: The average D.C. voltage values of separate regions of the selected video frame are added and subtracted in a manner likely to generate a large attribute value for typical video images. The sizes and locations of the image regions are chosen to maximize immunity to tilt, noise and distortion. The resultant value is divided by the average D.C. amplitude value of the video frame, to eliminate attribute measurement errors that might be caused by video gain discrepancies in intervening hardware devices or in the transmission path.

Second Example: This is a specific implementation of the above first example for MPEG compresses video. Consider an 8×8 pixel MPEG-2 macro-block grid symmetrically disposed about the center of the video frame. Imagine each macro-block to be colored black or white in the traditional "checkerboard" pattern. The attribute is equal to [the sum of all of the D.C. terms of the white blocks minus the sum of all of the D.C. terms of the black blocks] divided by the sum of the D.C. terms of all of the blocks.

Field Markers—Examples

First field marker example: The first 1.5 microseconds of the first horizontal scan line of every video field (or frame) is set to 25% of video gray level. Like the other field markers described here, this marker is located in the overscan part of the video frame, so as not to be visible on a television set. (This location is not, however, limiting.) To mark a specific field, an e.g. 2.5 MHz sine wave at 50 IRE units peak to peak is added to this gray level.

This field marker can be detected reliably even after passage through a poor quality cable television channel. However, advantageously it will not survive passage through a VHS or 8 mm VCR's (video cassette recorder) signal processing and recording circuitry, though it will survive S-VHS recording. This is because this field marker is filtered out by the chroma comb filter in the VHS or 8 mm VCR. Thus, after recording and playback by a VHS or 8 mm VCR, the field markers are effectively eliminated, thereby prohibiting second generation copying by a compliant recorder.

Second Example: This example is operable for e.g. VHS, S-VHS and 8 mm VCRs. The first 1.5 microseconds of the first two horizontal scan lines of every field (or frame) is set to the 25% gray level. To mark a specific field, a subcarrier-frequency sine wave at 50 IRE units peak to peak is added to this gray level, such that its phase with respect to synchronization is the same on both scan lines, (unlike a normal chroma signal whose phase reverses on alternate scan lines.) This marker can be detected reliably even after passage through a poor quality cable television channel. However, it will not survive passage through any consumer-type VCR's chroma filter. On playback, the VCR's comb filter will reduce the chroma on scan line 1 to 25 IRE units and on scan line 2 to zero. The field marker detector in a compliant recorder is set to detect this signal on scan line 2 only. Thus after recording and playback by an analog VCR, the field markers are effectively lost, thereby prohibiting further copying of the video by a compliant digital recorder.

Third Example: This field marker is operable for VHS, S-VHS and 8 mm VCRs. It begins with the selection of a 24×4 pixel block in e.g. the bottom left corner of the video field (or frame). The next step is to replace the chrominance values within the 24×4 pixel block with a fixed pattern marker, e.g. with alternating blue and yellow values. This marker must survive MPEG compression so as to be detected reliably even after passage through a poor quality cable channel. However, it must not survive passage through any consumer type VCR's chroma filter. The field marker detector in a compliant recorder is set to detect this signal on scan line 2 only. Thus after recording and playback by a VCR, the markers are effectively lost, thereby prohibiting second generation copying by a compliant recorder.

In light of the added protection afforded to copy right owners, using VCR-erasable markers appears to be a worthwhile enhancement to the present copy-once system.

Some of these marking principles may be subject to minor modifications to be fully compatible with MPEG compression. In light of the added protection afforded to video material, they appear to be a worthwhile enhancement to the present copy-once system.

Additional Embodiment—Frame Marker and Watermark

1. In another embodiment, for encoding, a frame (or field) marker is added pseudo-randomly to a particular video frame, in e.g. each 4 second long window. The frame marker is such (as described above) that it is automatically removed by a VCR. (An example of such a marker is fixed D.C. chroma values—both CRed and CBlue on the first line of the first macroblock). For the marked frame, an attribute value is calculated and saved.

2. The 4 attribute bits of the watermark are modified at a pseudo-random position in the following e.g. 2 seconds window to equal the attribute value of the previous marked frame.

3. During encoding, steps 1 and 2 are repeated throughout the video program.

4. When later recording a copy-once program, as above the frame marker is removed.

In addition to the regular watermark bits carried conventionally in the low and medium MPEG DCT coefficients, and just for copy-once, this embodiment adds 4 extra authorization bits to be carried by some of the high frequency MPEG DCT coefficients. If a copy-once state is detected from the regular watermark bits, the recorder checks if the 4 extra bits are present; if not, the recorder does not copy. If they are present, the compliant recorder adds sufficient noise before making the copy. This removes the 4 extra bits, removing the copy authorization.

One advantage of this approach is that conventional (non-compliant) VCRs (having no copy control systems) will remove the extra authorization bits automatically, making the output non-recordable by compliant (digital) recorders.

In this embodiment, the watermark includes two distinct portions, called WM1 and WM2. WM1 contains a payload of 8 bits, and is difficult to remove without degrading the picture quality. The payload bits are spread over low/mid/high MPEG DCT coefficient frequencies in macroblocks.

WM2 is e.g. a fixed 4-bit pattern or a CRC (cyclical redundancy check) value of the payload bits. WM2 is easy to remove, because the WM2 bits are spread over only the high frequencies and can be erased with a low pass or other filter. WM2 survives 4.2 MHz transmission, but not 2.5 MHz VHS recording. WM2 may have most of its energy spread horizontally in macroblocks, so that it is easy and inexpensive to erase or to render invalid. For greater robustness, the optional CRC (4 bits) is used.

The "WM2 erase" circuitry in the compliant recorder erases WM2 using a low pass filter or other filter on the video data; thus the required circuitry is minimal. The cost to add WM2 detection circuitry to the WM detect circuitry is very small because the WM2 detection circuitry reuses most of the WM1 detection logic.

Figure 3:
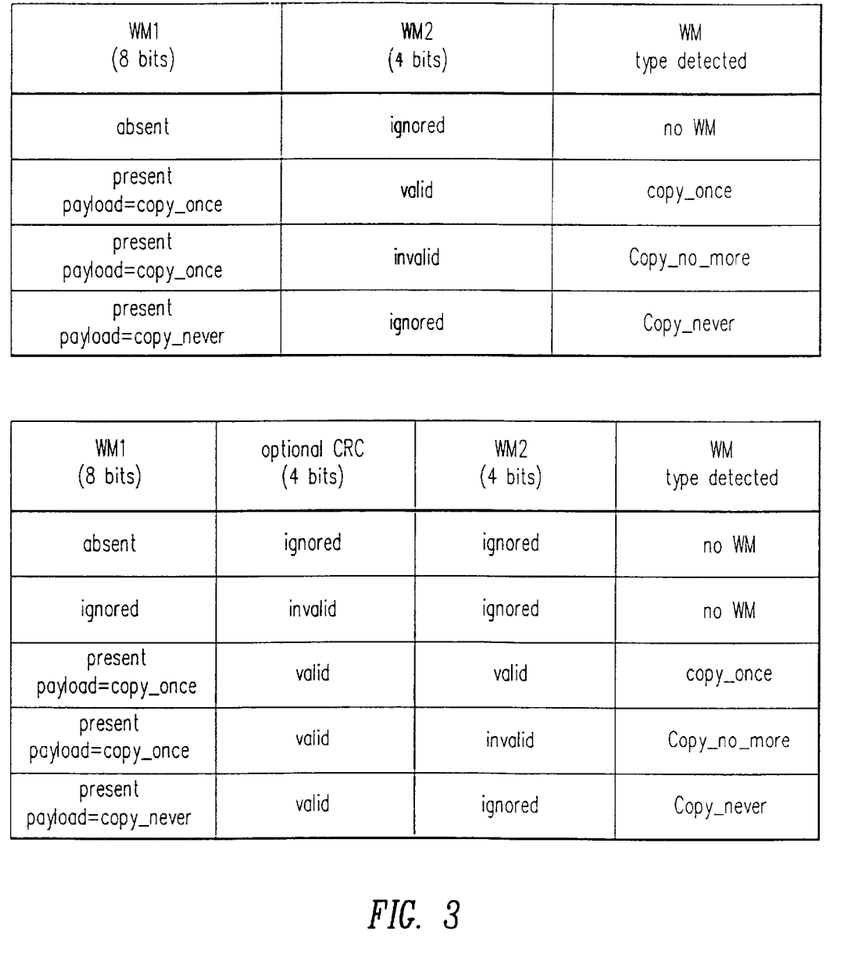
FIG. 3 is a table of characteristics in a dual watermark system.

FIG. 3 shows the states for this embodiment. In FIG. 3, the content of each watermark field is indicated for WM1 and WM2 along the top line of each column, with the associated action performed by a compliant recorder/player in the remainder of the column. The upper half of FIG. 3 is the simpler version of this embodiment; the lower half is the more complex version with the CRC. In both versions, copying is permitted only when WM1 is present with the copy-once bit set, and WM2 is valid (verified).

Defeat Process and Apparatus

Figure 4:
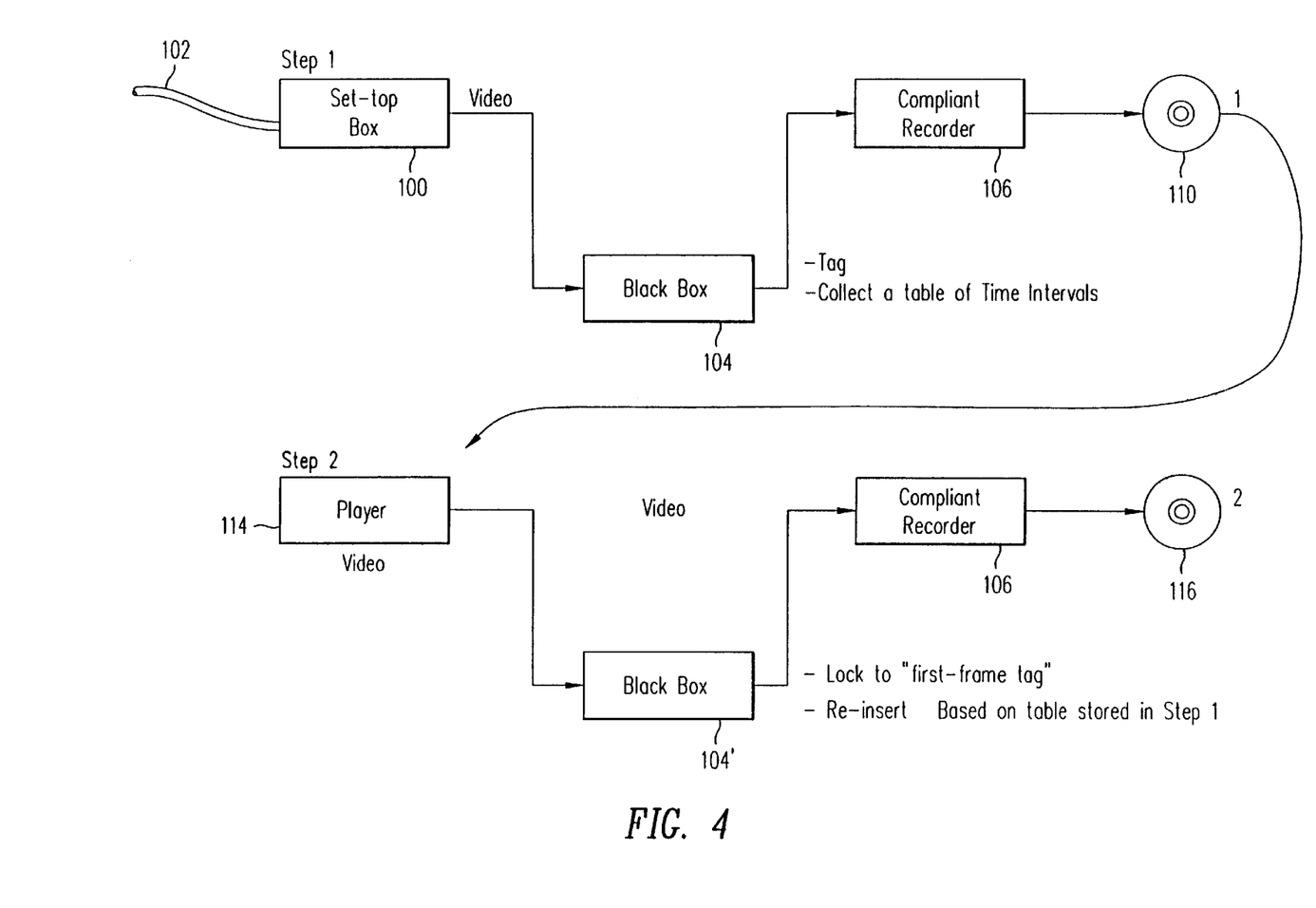
FIG. 4 shows a defeat method for the present copy-once process.

In addition to the copy-once embodiments described above, a method as described above to defeat the present copy-once processes is shown in FIG. 4, which depicts graphically both the defeat process and equipment. "Defeat" means providing a recording which may be in turn be copied; of course this violates the intention of the present copy-once system. Hence the present defeat method and apparatus normally would not be made available commercially by recorder manufacturers, but are disclosed here for completeness. (Use of such a defeat method or apparatus typically would involve copyright infringement.)

Several conventional elements are illustrated in FIG. 4, which include the conventional cable set top device ("box") 100 which is connected to a cable television cable 102 and sits "on top" of the consumer's television set (not shown). In this case a compliant recorder 106, which is a digital video recorder which includes the features of FIG. 2, is connected to the set top device 100. A person who desires to defeat the present copy-once process couples a defeat "black box" 104 between his cable set top device 100 and his compliant recorder 106. Details of this black box 104 are provided below; the black box 104 houses the defeat circuitry.

In step 1 in FIG. 4, a video copy-once protected program, including field markers, is received via cable 102 at the set top device 100 and is transmitted, via the black box 104, to the compliant recorder 106. The black box 104 includes circuitry which adds a "tag" (a special field marker) to the first video frame having a detected (original) field marker. (The black box 104 includes its own field marker detector like the FIG. 2 device.) This tag has particular characteristics described below. The black box 104 then stores in its internal memory a table of time intervals between the detected field markers on the video program. This table provides information on the timing of these original field markers. The video signal, with the tag added to the first field marked frame, is then coupled to the compliant recorder 106, which is of the type shown in FIG. 2.

The compliant recorder 106 then makes the permitted copy-once recording onto a first tape (or disk) 110. As described above, in doing so the compliant recorder 106 strips off all the original field markers. However it does not strip off the tag(s) added by the black box 104, because these tags are each a special type field marker, which unlike the original field markers, is not removed by the stripper circuitry in recorder 110.

In step 2 shown in the bottom half of FIG. 4, the recorded tape (or disc) 110 is then played on a player (or recorder) 114. Of course the played video includes none of the original field markers. This video is played through the black box 104' which has been reconfigured to its the play mode. (Black box 104' is otherwise the same as shown in the upper half of FIG. 4 but it is now programmed to be in its play mode rather than its record mode.) The black box 104' detects the tag(s) added by the black box 104 in the recording step 1 and using the first tagged frame as an indicator, then reinserts new field markers, of the type present in the original video material, at the time intervals indicated by the table previously stored (in step 1) in the black box 104'.

Thus the output video from the black box 104' is essentially the same as the original video, including all of the reinserted field markers. This video can then be recorded by the compliant recorder 106 which will output a second generation video recording on a second tape or disc 116 again having no field markers but still being viewable (but not copiable). Hence by the method of FIG. 4, one may provide a second generation video recording on tape or disc 116, thus defeating the present copy-once protection process.

Figure 5:
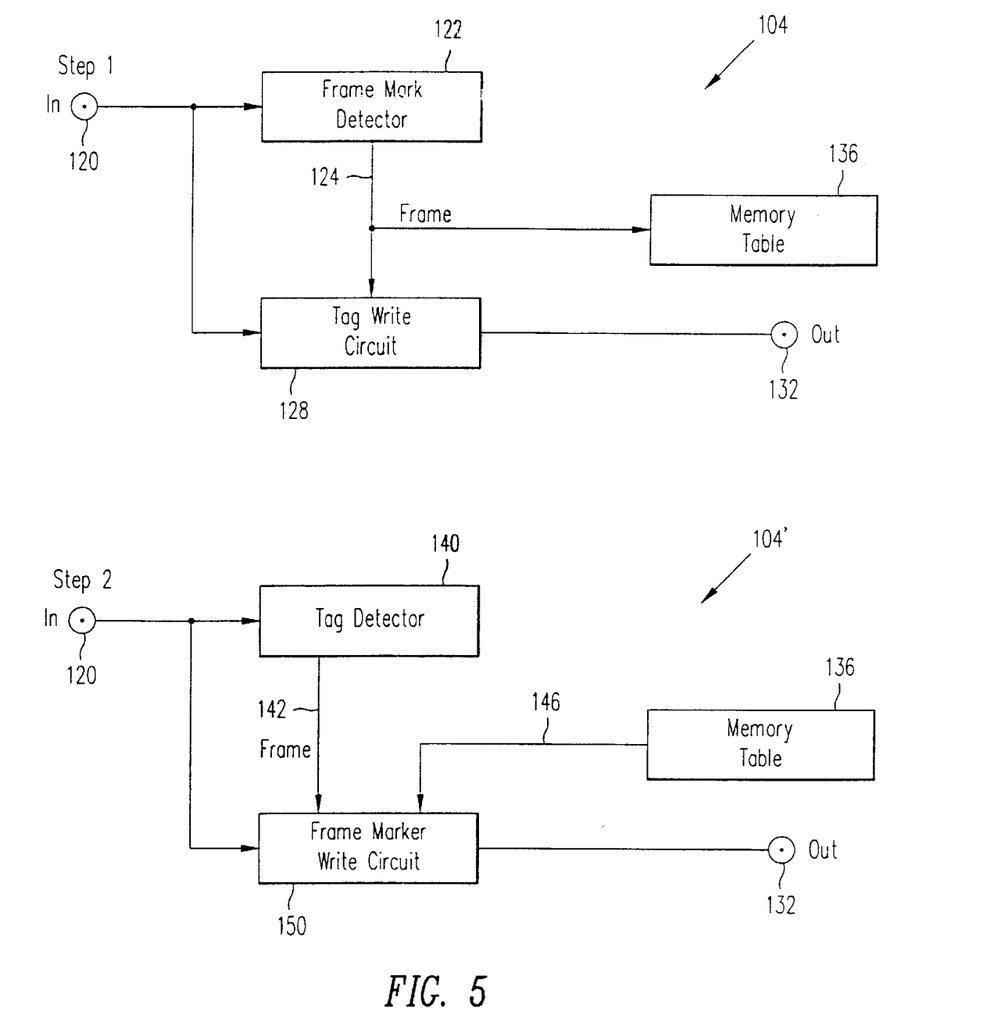
FIG. 5 shows the defeat apparatus of FIG. 4.

Internal structure of the black box 104, 104' is shown in FIG. 5. The upper half of FIG. 5 shows the black box 104 in its step 1 configuration. The input video from the set top device 100 is applied to input terminal 120 and then coupled to frame marker detector 122 which detects the original frame (field) markers. Control line 124 communicates an indication of the presence of detected frame markers to a tag write circuit 128 which thereupon adds tag(s) at least to the first field marked frame, and outputs this tagged video at output terminal 132, which in FIG. 4 which is coupled to compliant recorder 106. Similarly, the indication of the detected frames on line 124 is communicated to a memory 136 which includes a table for storing the time intervals between the detected frame markers.

The bottom half of FIG. 5 shows black box 104' in its step 2 configuration. Here the video (from the player 114) is coupled to the black box input terminal 120 which in turn is coupled to the tag detector 140 which detects the tags inserted by tag write circuit 128. An indication of each such detected tag is provided on a control line 142, indicating the particular frames which carries such tag(s). Line 142 controls the frame marker writer 150 which adds frame markers, corresponding to those in the original video, at the desired time intervals. These time intervals are determined by the data previously stored in the memory table 136 which in this case is read out on control line 146 to control when the frame marker write circuit 150 actually adds the frame markers.

Then the video with the new frame markers inserted by frame write circuit 150 is coupled to the black box output terminal 132, which in turn is coupled (in FIG. 4) to the input terminal of compliant recorder 106. This is an illustrative version of such a black box and is not limiting.

Construction of such a black box is well within the skill of one of ordinary skill in the art given the knowledge provided herein as to the nature of the field markers, and general knowledge available to one in video technology. The black box is essentially a digital device which has the functions of adding the tag to particular video frames, sensing the original field markers, and recording a table of same. Typically the black box is a microprocessor-controlled device including memory. The actual circuitry in the black box may take a variety of forms that perform the above-described functions.

Tagging For Various Video Delivery Methods

For a copy-once tagging system as described above, one must consider the process including content preparation, content delivery, and content viewing/recording. The following analyzes the process in term of various video delivery methods: analog cable and broadcast delivery; digital delivery through the existing installed base of digital set top devices with no digital (conventionally designated P1394) output; digital delivery through the existing installed base of digital set top devices with digital output; and digital delivery through new digital set top devices.

For analog cable and broadcast delivery, the content (programs) is prepared prior to delivery and the process of copy-once to copy no more transformation is performed in the recording device and may only occur in the video domain.

For digital delivery through the installed base of digital set top devices with no digital (P1394) output, the content is preferably prepared prior to authoring/MPEG encoding, but may also be prepared in conjunction with authoring/MPEG encoding. Nevertheless, copy-once marking should survive MPEG encoding/decoding. In this case, the copy-once to copy no more transformation is also performed in the recording device and may only occur in the video domain.

Digital delivery through the installed base of digital set top devices with digital output is similar, however the copy-once to copy no more transformation occurs in the MPEG domain.

Finally, for digital delivery through new digital set top devices, copy-once marking may also occur in the set top device itself. In addition, in the case of a P1394 output, the copy-once to copy no more transformation may also occur in the set top device as long as a copy authorization is sent from the set top device to the decoder.

For analog cable and broadcast delivery, the present system includes a fixed copy-once/copy no more watermark and the addition of a frame or field tag attached to randomly selected video frames or sequence of video frames to identify copy-once material. Transformation from copy-once to copy no more is performed by removal or degradation of the tag. In addition, in order to provide added security, an attribute of the tagged frame or sequence of frame is coded in the watermark. The watermark attribute code is randomly delayed to provide even higher security.

Examples of attributes include representation of the video characteristics of the tagged frame(s), position of the tagged frame(s) or length of the tagged sequence (which would be randomly selected to provide security).

The tags are of the type that are automatically removed by conventional VCRs and even non-compliant MPEG encoders. For instance, alternating lines of complementary colors at relatively low amplitudes (the tag pattern) would be removed by VHS and MPEG encoders during field to frame conversion. The tag is e.g. positioned in the lower left end corner (the tag area being e.g. 64 pixels×4 lines per field) of the video and invisible on television sets (due to overscan). To improve security, the tagging process removes chroma in the tag area on all video frames and adds the tag pattern to tagged frames. Tag removal is performed through chroma removal.

In the case of digital delivery through the installed base of set top devices with no digital output, the tagging system must be able to survive MPEG compression/decompression and will likely survive VCR and MPEG recording unless tagging is performed inside the encoder itself or the encoding process is constrained.

In order to maximize the effectiveness of the copy-once system, two tagging methods are supported by compliant recorders. The "stronger" tag defined above is selected for analog systems or for compatible encoders. A "weaker" tag with a tag pattern of horizontal cycles of complementary colors at relatively low amplitudes is selected for incompatible encoders.

For digital delivery through the installed base of set-top device with digital output, a digital recorder preferably performs the copy-once to copy no more transformation at minimal cost.

One approach is to add and remove an additional tag placed in the bit stream itself. However the watermark/tag carried in the video data would also be required to support the video output of the set top device and the digitally recorded copy would be labeled copy no more in the bit-stream and copy-once in the video. This then requires a synchronization system to be included in every player to ensure that no more copy be made.

Another more preferable approach is to minimize the added requirement for tag detection/tag removal. The conventional steps required to read the watermark in an MPEG stream are:

De-multiplex the transport stream.
Decode video stream down to the I-frame.
Decode all slices in the I-frame.
Process all macroblocks (MB's).
Process all luminance blocks.

Since, in this case only I-frames (this a type of MPEG frame) are used in the watermark reading process, the tag detection/removal process should be performed using I-frames only using the following steps:

Process tag area chroma blocks for detection.
Buffer the bit stream and substitute a pre-computed "no chroma" block bit sequence for the "tag chroma" block bit sequence in the tag macroblocks while ensuring that the video buffer verifier size (vbv) is not affected.

Since tag removal is performed only on I-frames and on macroblocks, the following issues and requirements arise.

For non-compatible encoders, there must be a sequence of tagged frames and it must be long enough to ensure that one I-frame will be included. It could be one frame or the distribution of tagged frames should be such that there is a sufficient number of I-frames among them. If a tagged frame sequence is used, attributes of the sequence should be deductible from the I-frame(s) attributes. This is better resolved by using frame position or frame sequence length as an attribute. In the frame position method, a tagged frame would carry a specific watermark code and untagged frames another. Any mismatch between watermark code and tag status creates a no-more-copy. In the frame sequence length method, frame sequence lengths randomly alternate between 3×D and 5×D, where D is some number larger than the largest allowable group of picture (GOP) size (maxGOP). In this method presence of a single tagged I-frame and sequence of I-frames covering less than maxGOP total frames would indicate no-more-copy. So would a sequence of I-frames covering more than D and less than 3D total frames matched with a 5×D code in the watermark or a sequence of I-frames covering more than 3D total frames matched with a 3×D code in the watermark. The later is the preferred method.

If a tag sequence is used, none of the tags of the frames preceding the first I-frame in the sequence will be removed. The position and sequence length methods described above resolve this. Tag removal from I-frames must frequently remove tags in other frames in the GOP. This will occur when no motion occurs in the tag area and could be improved by forcing motion vectors to zero in the tag area during encoding. Tag removal from I-frames must not create significant artifacts in other frames in the GOP. This could occur since the tag area could be used to predict any macroblock surrounding it in subsequent P and B frames. This is one of the reason why the tag in one embodiment uses complementary colors. Removal of the tag should not produce a visible chroma change. Tag removal through replacement of a precomputed chroma block implies either removing all chroma in a 54×16 area creating artifact visible on some televisions or carrying a bit stream in the user data that would have to be generated by a compatible encoder.

For compatible encoders, tag generation is performed by the encoder on I-frames only. Motion vectors are forced to zero on subsequent P and B frames and no intra-block coding is allowed on these frames. Motion prediction for non-tag blocks is forced not to use the tag blocks.

For digital delivery through new generation digital set top devices, frame tagging occurs only in the video output in the same manner ACP is generated. The pre-watermarked content is tagged (using the strong tag) by the video encoder using tag position information carried in the bit stream. On the P1394 side, the set top device enables P1394 output once a compliant recorder was identified. This system even allows one to specify whether a copy could be made through the analog or digital output independently. Copyright information and related data (tag position) are carried in the bit stream in the same way ACP information is currently carried.

Three possible systems are disclosed hereinafter. All three systems use a common recorder and a common architecture. No artifact are produced on original material (so that a program viewer will not see any effect) or on video copies (as opposed to MPEG copies).

For a copy-once architecture for compatible encoders, tags are inserted on I-frames only. For non-compatible encoders, tag sequences of 3 seconds and 5 seconds are randomly added to the video and after a random lag time a "tag length identifier" bit in the watermark is set to 0 for a 3 second sequence, 1 for a 5 second sequence. Another bit (Change Bit) is toggled every time a new tag sequence is being referenced (thus reducing the number of watermark to 10). A tag uses horizontal or vertical cycles of complementary colors at relatively low amplitudes on the 8 bottom lines of the lower left four macroblocks. An $11^{th}$ and $12^{th}$ bit are used to differentiate between what are here designated as systems 1, 2 and 3.

1. System 1 has analog delivery & digital delivery with compatible encoder/authoring. In this system, the vertical cycles are used, allowing removal of the tag by VHS VCRs and some non-compliant MPEG encoders. Tag removal is performed by blanking out the bottom eight lines of video on video recorder and the bottom sixteen lines of video on MPEG recorders.

For compatible encoders, one inserts the tag after the field to frame conversion, use tags on I-frames only, forces motion vectors to zero for the bottom macroblocks, forces motion prediction in other macroblocks not to use the bottom macroblocks and disallows intra-coding for tag area Macroblocks in P/B frames.

2. System 2 has digital delivery without compatible encoder/authoring In this system, the horizontal cycles are used. Tag removal in the MPEG domain is performed by removing the chroma in the tag macroblocks. Some artifacts may be visible in the tag area of digitally copied content on certain televisions. Security of this system may not be as strong on MPEG copies since a pirate may cue on the fact that 16 lines of chroma are missing in the tag area on tagged frames while only eight are missing on non-tagged frames.

3. System 3 has digital delivery in new networks. This system is not backward compatible with systems 1 or 2. However it provides a high quality, low cost solution for new networks or networks that would require the use of new set top devices to allow copy-once.

For video input, upon detection of a copy-once watermark, the recorder removes the tag by removing the chroma in the 8 bottom lines of a frame in the tag area.

For digital input, upon detection of a copy-once watermark (system 1 or 2), the tag detector identifies whether system 1 or two is used. For system 1, tag removal is performed by replacing the bottom slices with a pre-stored slice (blanking out the 16 bottom video lines) and padding so as not to affect the vbv. For system 2, tag removal is performed by replacing the bottom chroma tag blocks with pre-stored blocks (removing the chroma from the bottom left 4 macroblocks).

Upon detection of a copy-once watermark system 3, a copy is made as long as the P1394 authentication protocol identifies copy-once.

Video Tag (Frame/Field Marker)

The frame or field marker "tag" described above is a video signal or signal modification inserted into a video stream, which is essentially transparent to MPEG-2 compression but which is intrinsically rejected by (at least) a standard VHS type VCR, and which may be thereafter read from the video signal to convey information. The tag is preferably transparent to MPEG-2 compression so that it may be inserted into the video prior to the MPEG encoding, thereby requiring no modification of the MPEG encoder. The information intended to be conveyed involves the copy protection status of the associated video; however, other applications are possible as well, and this type of tag is not limited to the copy protection field. Other applications are authentication or data transmission.

One may use a chroma-inversion tag, in which successive selected lines have a specific chroma pattern injected or superimposed, such that the modulated chroma on successive lines is phase-inverted. The intent is that the comb filter in the VCR cancels that signal. However the format-required vertical subsampling of chroma in the MPEG-2 encoding system requires vertical anti-aliasing filtering. One pattern essentially consists of a high vertical frequency transition in the chroma spatial domain, and the MPEG-2 anti-aliasing filter is essentially a vertical low-pass filter. (Indeed, the architecture of the VCR's comb filter is structurally identical to the MPEG-2 anti-aliasing filter, with the anti-aliasing filter typically having a more complex, lower-frequency cutoff than does the comb filter.) As such, the anti-aliasing filter eliminates the inserted chroma pattern just as does the comb filter; thus the inserted signal undesirably is lost in all formats of interest.

Figure 6A:
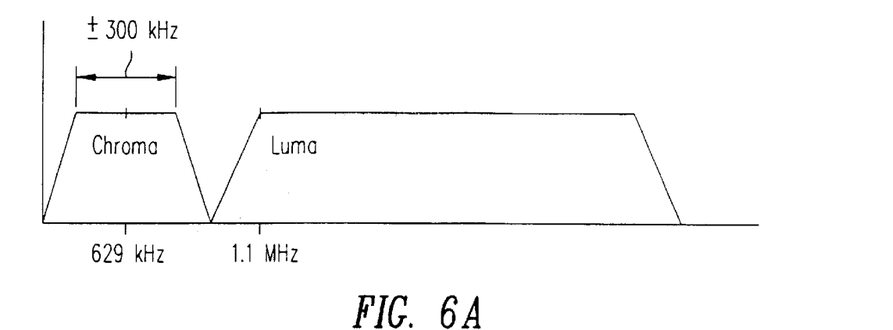
FIGS. 6A to 6D show use of a particular video tag in accordance with the invention.

The baseband chroma bandwidth of the MPEG-2 system is approximately 1.4 MHz, depending upon implementation. FIG. 6A shows the well known spectrum of the color-under VHS format video signal. The baseband chroma bandwidth of a standard VHS VCR is approximately 300 kHz, again depending upon implementation. There is therefore a region in the baseband chroma domain extending from approximately 300 kHz to approximately 1.4 MHz (1.1 MHz bandwidth) in which a signal will pass through an MPEG-2 encode/decode chain yet will be rejected by a standard (consumer type) VHS VCR (NTSC or PAL).

It is desirable that the tag signal to be injected exists entirely and solely in that region, in order that no component of it shall pass through the VCR's 300 kHz chroma path. The VCR's own chroma-channel filtering ensures that no component of the inserted tag signal intrudes into the VCR's luma path.

Figure 6B:
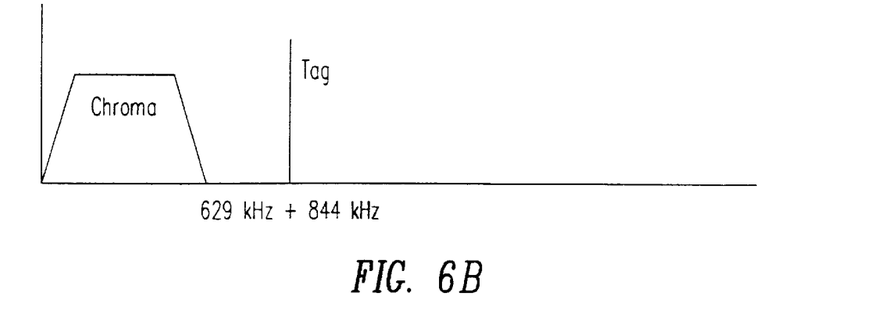
Figure 6C:
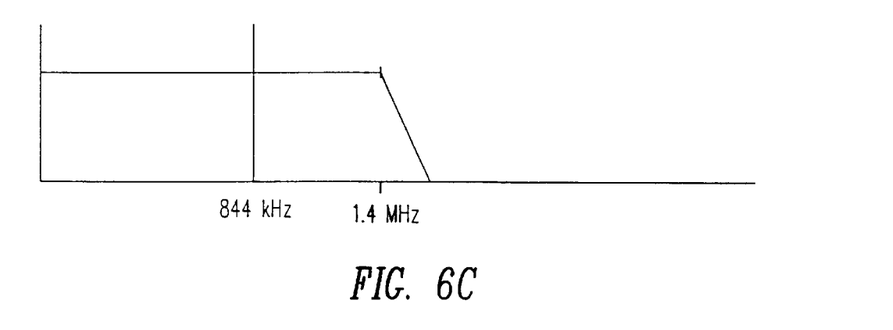
Figure 6D:
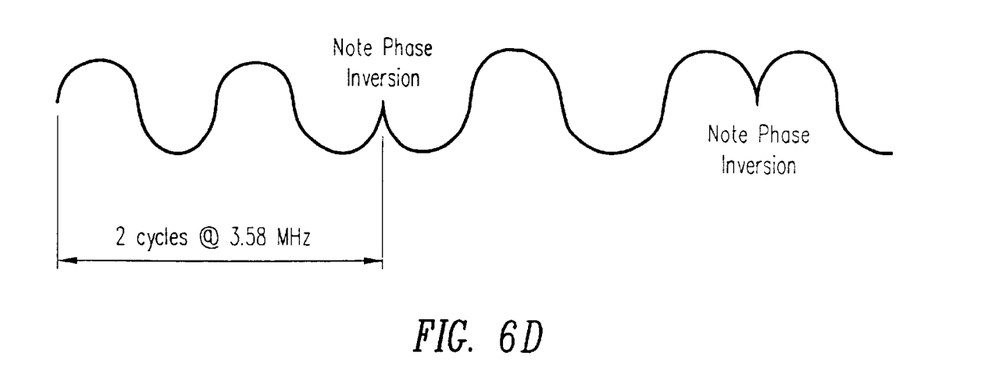

One embodiment of the tag signal (see FIG. 6B showing the spectrum of the present inserted tag compared to that of the color-under chroma channel) is an 844 kHz chroma square wave consisting of a repeating horizontal pattern of four consecutive CCIR-601 4:2:0 chroma samples of green followed by four consecutive chroma samples of magenta. In the video domain, this is a chroma signal which inverts its phase approximately every two cycles of chroma (at 3.58 MHz) and may be regarded as a double-sideband suppressed-carrier signal having only two spectral components: one at (3.58 MHz-844 kHz) and one at (3.58 MHz+844 kHz). In particular, there are no spectral components within 300 kHz of 3.58 MHz. FIG. 6C shows the spectrum of the inserted tag compared to the MPEG-2 baseband chroma channel, and FIG. 6D shows the modulated chroma waveform of the injected tag.

Other tag implementations are possible. The pattern need not be a square wave, although the square wave is the easiest to generate; it could, for instance, be a sine wave. Similarly the pattern need not be at 844 kHz; any frequency which is sufficiently higher than approximately 300 kHz and lower than approximately 1.4 MHz will do. An alternative frequency is 1.125 MHz, which consists of three CCIR-601 samples of green and three of magenta. Moreover, the pattern need not be symmetrical nor, indeed, even repetitive—any pattern or signal whose primary energy lies below approximately 1.4 MHz but which has no content below approximately 300 kHz works well; the choice is made to simplify the implementation.

One method of conveying information with this signal is to insert tags of several different lengths such that they can be measured in numbers of I-frames, and then put in an accompanying video watermark information representing the length of the tag. The system then requires that the two match, before enabling a copy.

In order to minimize visibility of a signal such as this, it is desirable to make its various elements as small as possible, both horizontally and vertically, and of such a nature that they tend to disappear visually. The tag in another embodiment thus consists of colored small areas alternating both horizontally and vertically to form a "checkerboard" pattern. The colors in one embodiment are green and magenta, because these are complementary colors with very similar luminance values and the eye tends to spatially average them into a uniform gray; other colors are possible. The colored areas should be as small as is consistent with the spatial resolution capabilities of the chosen format; in the case of MPEG-2 compression the limitation is the horizontal and vertical anti-aliasing filters which precede the chroma subsampling which that format dictates.

Details of this embodiment are implementation-dependent. For a typical MPEG-2 application, using a digital anti-aliasing filter with coefficients [−29, 0, 88, 0, −29] *256 for both horizontal and vertical subsampling, one embodiment of the tag signal is created by applying a sequence of fully-sampled (i.e. 13.5 MHz) pixels consisting of a green pixel, two gray pixels, a magenta pixel and two more gray pixels to the indicated anti-aliasing filters. This sequence is duplicated in both the horizontal and vertical directions to create the desired "checkerboard" pattern, and is continued in both directions (or "repeated") for as far as is desirable and useful to the application at hand.

The individual green and magenta pixels constitute impulse functions input to the anti-aliasing filters, and the filter output signal is a sequence of pixels corresponding to the filter coefficients—that is, a single pixel output to the indicated filter will result in an output sequence of pixels with an amplitude pattern of −29, 0, 88, 138, 88, 0 and −29. The total output of the filter is the linear sum of its responses to each of the input pixels. In the embodiment described above, if a magenta pixel is coded as "−1", a gray pixel as "0" and a green pixel as "+1", the steady-state response of the filter to the tag sequence described above will be . . . 88, −88, −196, −88, 88, 196, 88, −88, −196, . . . which describes chroma sine wave at 1.125 MHz.

The checkerboard pattern is created by arranging the input signal such that, in any given tagged scan line, a given pixel conforms to the indicated spatial pattern. That is, if pixel 20 in line 460 of the input is green, then pixel 20 in lines 461 and 462 should be gray, pixel 20 in line 463 should be magenta and pixel 20 in lines 464 and 465 should be gray. Pixels 21 22, 24 and 25 would be gray in all tagged lines, and all pixels in the tagged portions of lines 461, 462, 464 and 465 would also be gray. The action of the anti-aliasing filters will then smear the single colored pixels into the desired sine waves in both the horizontal and the vertical directions.

This disclosure is illustrative and not limiting; further modifications will be apparent to one skilled in the art in light of this disclosure and are intended to fall within the scope of the appended claims.

We claim:

1. A method for copy protecting a digital video signal comprising the steps of:
   placing a marker on selected fields or frames of the video signal;
   measuring an image attribute of each of the selected frames; and
   marking the video signal with a signal that includes a numeric representation of the measured attribute.

2. The method of claim 1, wherein the marked signal is a watermark.

3. The method of claim 1, wherein the attribute is calculated from an amplitude of a predetermined portion of the selected frame.

4. The method of claim 1, wherein the signal includes at least one bit indicating that copying of the video signal is permitted.

5. The method of claim 1, wherein the marker is located in an overscan portion of the frame.

6. The method of claim 1, wherein the marker is located in a blanking interval of the frame.

7. The method of claim 1, wherein the marker is a signal that is filtered out by a conventional analog video recorder.

8. The method of claim 1, wherein the signal includes a portion that is a signal which is filtered out by a conventional analog video recorder.

9. The method of claim 1, wherein the marker is a repeated chroma wave.

10. The method of claim 9, wherein the marker is a repeated square waves.

11. The method of claim 1, wherein the marker has a frequency between approximately 300 KHz and 1.4 MHz.

12. The method of claim 10, wherein the marker is a checkerboard pattern including two complementary colors.

13. A method of playing a protected video signal, the protected video signal including in at least one frame marker and having an associated signal including a numeric representation of an image attribute of the frame having the marker, the method comprising the steps of:
   detecting the marker to identify a particular frame;
   detecting the signal associated with the frame;

measuring the image attribute of the identified frame;

comparing the measured attribute to the numeric representation of the attribute for the identified frame; and enabling recording of the video signal only if the comparing step indicates a match.

14. The method of claim 13, wherein the signal is a watermark.

15. The method of claim 13, wherein the attribute is calculated from an amplitude of a selected portion of the frame.

16. The method of claim 13, one further comprising determining if the signal includes a copy enable bit, and only enabling copying if the copy enable bit is present.

17. The method of claim 13, further comprising the step of changing the copy enable bit during the recording of the video signal.

18. The method of claim 13, wherein the marker is located in an overscan portion of the frame.

19. The method of claim 13, wherein the marker is located in a blanking interval of the frame.

20. The method of claim 13, wherein the marker is a signal that is filtered out by a conventional analog video recorder.

21. The method of claim 13, wherein the signal includes a portion that is filtered out by a conventional analog video recorder.

22. The method of claim 13, wherein the marker is a repeated chroma wave.

23. The method of claim 22, wherein the marker is a repeated square wave.

24. The method of claim 13, wherein the marker has a frequency between approximately 300 KHz and 1.4 MHz.

25. The method of claim 22, wherein the marker is a checkerboard pattern including two complementary colors.

26. A digital video recorder adapted for a copy-once protocol for a video signal, the recorder including:

video recording circuitry;

an input terminal for receiving the video signal;

a marker detector which detects a mark in a frame of the received video signal;

a detector which detects a signal associated with the frame;

attribute measuring circuitry which measures an image attribute of the frame; and a comparator which compares the measured attribute to a numeric representation of the attribute in the signal and enables operation of the video recording circuitry only if there is a match.

27. The apparatus of claim 26, wherein the detector also determines if a copy enable bit is set in the digital signal watermark, and wherein the comparator only enables copying if the copy enable bit is set.

28. The apparatus of claim 27, further comprising a circuit for changing the copy enable bit during the recording of the video signal.

29. An encoding apparatus for protecting a video signal, comprising:

a terminal for receiving the video signal;

a marker circuit which places a marker on selected frames of the received video signal;

a measurement circuit which measures an image attribute of each of the selected frames; and a circuit which marks the video signal with a signal that includes a numeric representation of the measured attribute of each frame having a marker.

30. The apparatus of claim 29, wherein the marker is located in an overscan portion of the frame.

31. The apparatus of claim 29, wherein the marker is located in a blanking interval of the frame.

32. The apparatus of claim 29, wherein the marker is a signal that is filtered out by a conventional analog video recorder.

33. The apparatus of claim 29, wherein the signal includes a portion that is a signal which is filtered out by a conventional analog video recorder.

34. A method for enabling copying of a protected video signal including in at least one frame a marker and having an associated signal including a numeric representation of an image attribute of at least one frame, the method comprising the steps of:

detecting frames carrying the marker;

tagging one of the detected frames with a predetermined signal;

storing data indicative of a timing of each of the detected frames;

recording the video;

replaying the recorder video;

while replaying the video, detecting the tagged frame; and inserting in the tagged frame and in selected subsequent frames a marker resembling the marker included in the protected video, the inserting being in accordance with the stored data.

35. The method of claim 34, wherein the predetermined signal differs from the markers.

36. The method of claim 34, wherein the predetermined signal is a signal that is not removed by a digital video recorder.

37. The method of claim 34, wherein the associated signal is a watermark.

38. An apparatus for enabling copying of a protected video signal including in at least one frame a marker and having an associated signal including a numeric representation of an image attribute of the frame, comprising:

an input terminal for receiving the protected video signal;

a first detector coupled to the input terminal and which detects the frame markers;

a circuit coupled to the detector which writes a predetermined signal in at least one of the marked frames;

a memory coupled to the first detector which stores data indicative of a timing of each of the detected marked frames;

a second detector which detects the predetermined signal; and a circuit for inserting a frame marker into the video signal which is similar to the markers present in the protected video signal, the inserting being in accordance with the stored data.

39. The apparatus of claim 38, wherein the predetermined signal differs from the frame marker.

40. The apparatus of claim 38, wherein the predetermined signal is a signal that is not removed by a digital video recorder.

41. The apparatus of claim 38, wherein the associated signal is a watermark.

42. A method of processing an original video signal to limit copying thereof, the original video signal having a watermark therein conveying data related to copy restriction, the method comprising:

inserting a video marker in the original video signal, the video marker having an attribute corresponding, in a predetermined manner, to characteristics of the original video signal, wherein the correspondence indicates that the video signal is the original video signal;

in response to a request to output the video signal for copying, detecting the watermark and checking that the video signal is the original video signal, the checking including checking the video marker's predetermined correspondence to the video signal, and only if the video signal is thereby confirmed to be the original video signal then:

processing the original video signal to produce a copy thereof, the copy being non-identical to the original video signal so that the video marker no longer corresponds, in said predetermined manner, thereto;

wherein subsequent checking of the copied video signal indicates that the video signal is not the original signal, whereby further copying can be restricted.

43. The method of claim 42, in which the processing includes changing the video marker.

44. The method of claim 43, in which the processing includes eliminating the video marker.

45. The method of claim 43, in which the processing comprises converting the original video signal from digital to analog form.

46. The method of claim 1, wherein the image attribute indicates video characteristics of the selected frames.

47. The method of claim 1, wherein the image attribute indicates positions of the selected frames.

48. The method of claim 1, wherein the image attribute indicates lengths between the selected frames.

49. The method of claim 13, wherein the image attribute indicates video characteristics of the selected frames.

50. The method of claim 13, wherein the image attribute indicates positions of the selected frames.

51. The method of claim 13, wherein the image attribute indicates lengths between the selected frames.

52. The apparatus of claim 26, wherein the image attribute indicates video characteristics of the selected frames.

53. The apparatus of claim 26, wherein the image attribute indicates positions of the selected frames.

54. The apparatus of claim 26, wherein the image attribute indicates lengths between the selected frames.

55. The apparatus of claim 29, wherein the image attribute indicates video characteristics of the selected frames.

56. The apparatus of claim 29, wherein the image attribute indicates positions of the selected frames.

57. The apparatus of claim 29, wherein the image attribute indicates lengths between the selected frames.

* * * * *